United States Patent [19]

Giraud et al.

[11] 4,031,392
[45] June 21, 1977

[54] METHOD AND DEVICES FOR COUNTING EVENTS, PARTICULARLY RADIOACTIVE DISINTEGRATION EVENTS

[75] Inventors: Pierre Giraud, Paris; Conrad Palais, Parly II Le Chesnay, both of France; Edward Rapkin, Short Hills, N.J.

[73] Assignee: Intertechnique S.A., Plaisir, France

[22] Filed: Mar. 31, 1976

[21] Appl. No.: 672,287

[30] Foreign Application Priority Data

Nov. 17, 1975 France .............................. 75.35085

[52] U.S. Cl. .................................. 250/328; 250/369
[51] Int. Cl.² ........................................... G01T 1/20
[58] Field of Search ................... 250/328, 366, 369

[56] References Cited

UNITED STATES PATENTS

| 3,320,419 | 5/1967 | Thomas et al. | 250/328 X |
| 3,560,744 | 2/1971 | Jordan | 250/328 X |
| 3,767,915 | 10/1973 | Battist | 250/366 |

Primary Examiner—Archie R. Borchelt
Attorney, Agent, or Firm—Lane, Aitken, Dunner & Ziems

[57] ABSTRACT

A liquid scintillation spectrometer comprises two PM detectors, a circuit for detecting prompt coincidences between the signals from the detectors and a circuit for detecting delayed coincidences. Counting means controlled by the coincidence circuits detect the excess of the occurrences of prompt coincidences over delayed coincidences and count that excess in real time.

8 Claims, 1 Drawing Figure

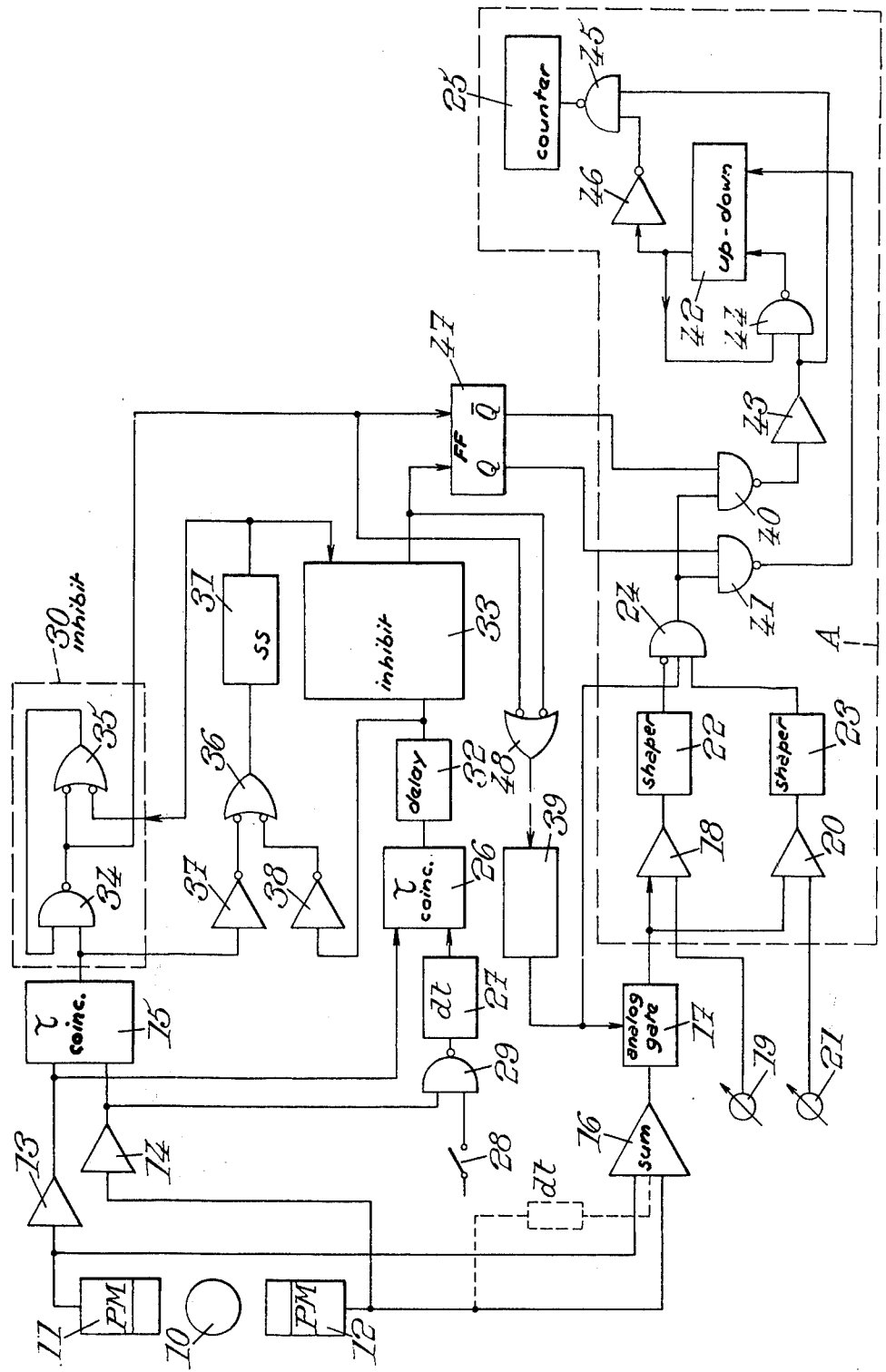

METHOD AND DEVICES FOR COUNTING EVENTS, PARTICULARLY RADIOACTIVE DISINTEGRATION EVENTS

BACKGROUND OF THE INVENTION

The invention relates to devices for counting events from which two signals in time coincidence may be derived. It is of particular interest for counting disintegrations in a sample labelled with one or more radioactive tracers, inter alia by liquid scintillation spectrometry.

The determination of the activity of samples labelled with beta emitters by liquid scintillation spectrometry has numerous advantages; the counting yield is high even for low-energy beta emitters such as $^3$H and $^{14}$C; background noise is relatively low; and the samples are easy to prepare.

Liquid scintillation spectrometry, however, has some shortcomings. The counting efficiency is lowered by light attenuation phenomena conventionally called "quenching." This shortcoming has been overcome by using standardization methods which have now been well developed.

Another problem which occurs in the certain cases is related to background noise due to chemical interactions in the sample or between the sample and the other components (e.g. a solvent, solubilizing agent, wetting agent, or scintillator) in the liquid solution in which the sample is present. The interactions result in the emission of single photons and produce a background noise in addition to the noise from other origins. That additional background noise may be quite variable. It is known under the general term "chemi-luminescence."

This interfering luminescence results in the appearance of single photons, whereas the events to be counted are represented by showers of photons resulting from an energy exchange between the radiation and the scintillator. A large fraction of the signals due to chemi-luminescence may be eliminated by pulse height analysis, and by the use of two photomultipliers associated with a coincidence circuit in modern spectrometers. The coincidence circuit, which is provided to eliminate the effects of thermionic emission in each photomultiplier, reduces the background noise by a ratio of the order of $10^{-5}$ for typical resolving times $\tau$ of the coincidence circuit. In many cases, however, this ratio is insufficient. The emission rate of single photons by chemi-luminescence results in a background noise which is not negligible compared with the true activity of the test sample, and adds an unknown and significant contribution.

Various methods have already been suggested for reducing the effects on counting on phenomena which result in the emission of a high rate of single photons producing random coincidencies, such as chemi-luminescence.

One such method, which was described in "Nuclear Instruments and Methods" 73 (1969), pages 67–76, includes the step of recording the number of time coincidences detected by a circuit, the first input of which directly receives signals coming from a second detector via a delay line.

If the detectors are assumed to be photomultipliers, there is no time correlaion between spontaneous emissions of single photo-electrons by the photomultipliers and photon emission by chemi-luminescence is of random nature; the rate of "delayed" coincidences will be equal to the rate of random coincidences to which a "prompt" or "direct" coincidence circuit is subject during the same time interval, provided that the two coincidence circuits have the same resolving times, and subject to statistical errors. On the other hand, the delayed coincidence circuit is normally insensitive to true coincidences recorded by the prompt coincidence circuit.

This solution is not entirely satisfactory. If, during a single time interval, a count is made of :
  all the prompt and delayed coincidences and
  the delayed coincidence only (i.e. the random coincidences),
then, two high-capacity counters are needed. The device does not give information in real time. If the pulse rate is very high and variable, the correction given by statistical subtraction is not complete. Finally, present day systems of that type cannot provide pulse height analysis in real time.

In a simpler method, several countings of the acitivity rate of a sample are successively carried out. If it is found that the rate decreases between successive measurements, it is assumed that chemi-luminescence is present and counting of the sample is delayed until the decrease is not appreciable. In some cases, the decrease continues for a very long time, so that the sample has to be rejected without counting. It is never possible to make an immediate determination of the true activity of a sample exhibiting chemi-luminescence.

SUMMARY OF THE INVENTION AND SHORT DESCRIPTION OF THE DRAWING

It is an object of the invention to count events producing coincident signals, while substracting random coincidences accurately and efficiently.

According to an aspect of the invention, the signals from a sample are detected on two different channels; prompt coincidences between the signals on the two channels are detected; the signals on one channel are delayed by a predetermined time duration with respect to the signals on the other channel; delayed coincidences between the signals transmitted by the two channels having the relative time delay are detected and only prompt coincidences in excess of the delayed coincidences are counted and recorded.

According to another aspect of the invention, there is provided a counting device comprising a circuit which detects prompt coincidences between the output signals of two detectors and delivers a logic signal upon each detected prompt coincidence. To make the correction, the device also comprises a logic circuit which derives a signal delayed by a predetermined time $dt$ from the signal supplied by the first detector, and a circuit which detects delayed coincidences between the output signal of the second detector and the delayed signal and which delivers a logic signal responsive to each delayed coincidence.

Means controlled by the coincidence detection circuits count and record in real time the excess of prompt coincidences over delayed coincidences.

If the device is a liquid scintillation counting device whose detectors are photomultiplier tubes, a summation and amplifying circuit is typically provided, receives pulses from the photomultipliers and delivers an analog signal representing the sum of the amplitudes of the signals received from the photomultipliers to a linear or analog gate. A pulse height analyzing circuit receives the output signals from the linear gate and transmits those signals having an amplitude within a predetermined range. In this case, the device may comprise a logic circuit which, from the signal supplied by the first photomultiplier, provides a signal delayed by a time interval $dt$, and a circuit which detects delayed coincidences between the output signal of the second photomultiplier and the delayed signal and which outputs a logic signal upon each occurence of a delayed coincidence. The linear gate is controlled by the outputs of the two coincidence circuits so as to be acitvated or enabled by either of them.

The inventionwill be better understood from a consideration of the following description of an embodiment of the invention given by way of non limitative example. The description refers to the accompanying drawing, whose single FIGURE is a block diagram of the parts according to the invention of the circuits of a liquid-scintillation spectrometer.

DETAILED DESCRIPTION OF PREFERRED EMBODIMENTS

Referring to the single FIGURE, there are illustrated components which are conventional in liquid scintillation spectrometers, including two high-gain photomultiplier tubes 11, 12 supplied by a high-voltage source (not shown). The photomultipliers are located one on each side of a measuring station adapted to receive a sample 10 labelled with one or more beta emitters. The electric signals delivered by the photomultipliers 11, 12 are applied via pulse shaping amplifiers 13, 14 to respective inputs of a coincidence circuit 15 having an accurately defined resolving time $\tau$ which is as short as possible. That circuit will detect prompt coincidences, which comprise random coincidences and true (or legitimate) coincidences due to disintegrations in the sample.

The output signals from photomultipliers 11, 12 are also applied to the inputs of an analog summing and amplifying circuit 16, the output of which is connected to a pulse height analysis and counting circuit (designated as a whole as A) via a linear gate 17. Amplifier 16 is usually, though not necessarily, logarithmic.

The pulse height analysis and counting circuit A may be conventional and comprise an input pulse height analyzer. The pulse height analyzer may comprise an upper discriminator 18 which has a threshold manually adjustable by a potentiometer 19 and is connected to a shaping circuit 22, and a lower discriminator 20 which also has a threshold adjustable by a potentiometer 21 and is connected to a shaping circuit 23. The outputs of the two shaping circuits are applied, one directly and the other through an inverter, to an AND gate 24. In the embodiment shown, an additional input of AND gate 24 is connected to the set output of the monostable 39, so as to be enabled by the trailing edge of the signal from the monostable.

In a conventional liquid scintillation spectrometer, the linear gate 17 is enabled only by the prompt coincidence circuit 15, via a circuit 30 producing a temporary inhibition for a period fixed by a monostable 31 after each pulse. The output of the gate 24 is directly connected to a pulse counter, which therefore records random plus true coincidences in a conventional spectrometer.

The device illustrated in the single figure comprises circuits arranged for counter 25 to receive a number of pulses statistically equal to the number of true coincidences.

To this end, the device comprises additional means for identifying the delayed coincidences, which are nearly all random coincidences. The additional means comprise a coincidence 26 having the same resolving time as circuit 15. One input of circuit 26 directly receives the output signals from pulse shaping circuit 13, whereas the other input receives the output signals from circuit 14, delayed by a logic circuit 27 providing a time delay $dt$. Delay $dt$ provided by the last-mentioned circuit must be greater than the resolving time for prompt coincidences (approx. 30 ns) and usually not exceed 1 $\mu s$; a value of 0.4 $\mu s$ is suitable in most cases.

In the circuit illustrated in the drawing, the means for identifying delayed coincidences can be inactivated or disabled by opening a switch 28 located on the enabling input of a NAND gate 29 whose other input is connected to the output of circuit 14 and whose output is connected to the delay circuit 17.

The output of delayed coincidence circuit 26 is connected via a delay circuit 32 (if the delay due to 27 is greater than the recovery time of amplifiers 13 and 14) to a temporary inhibition circuit33 which is similar to circuit 30 and whose inhibition time duration is controlled by the same monostable or univibrator 31.

Each circuit 30, 33 may comprise a first NAND gate 34 and a NOR blocking gate 35 which is looped back to gate 34 and which has one input receiving the output of gate 34 and another input receiving the output of monostable 31. Monostable 31 is triggered whenever it receives, via a NOR gate 36, an output signal from coincidence circuit 15 or 26 and a respective inverter 37 or 38.

Each pulse transmitted from the coincidence circuit 15 by NAND gate 34 (before the latter is inhibited)is applied to the Q input of a flip-flop circuit 47; similarly each pulse transmitted by circuit 26 is applied (after a delay determined by 32) to the $\overline{Q}$ input of the flip-flop. In addition, both types of pulses are transmitted by a NOR gate 48 and a shaping and latch circuit 39 to the enabling input of linear gate 17. Circuit 39, which usually consists of a monostable circuit, applies the signal to the gate for a time sufficient to compensate for the time lag of the analog channel as compared with the logic channel (typically about 1 $\mu s$).

The Q and $\overline{Q}$ outputs of flip-flop circuit 47 are respectively connected to NAND gates 40, 41 so that when flip-flop circuit 47 is in state $\overline{Q}$, only gate 40 is enabled, and vice versa. Gates 40, 41 also receive the output signals from AND gate 24 and their outputs are connected as follows:

output of gate 41 is connected to the "up-count"input of a buffer scaler 47 having a few number of bits (8 bits being sufficient in most cases); and output of gate 40 is connected via an inverter43 and a NAND gate 44 to the "down-count" input of buffer scaler 42 and is also connected via an inverter 43 and a NAND gate 45 to the input of counter 25, which counts true or legitimate coincidences.

The condition of scaler 42 determines whether NAND gate 45 is disabled or enabled and thus controls the tranmission to counter 25 of pulses arriving via gate 40 and representing prompt coincidences. For this purpose, the enabling inputs of gates 45 and 44 are connected (via an inverter 46 in the case of the input of gate 45) to an output of scaler 42 which is energized when the scaler content is zero.

Operation of the system is as follows:

when the content of scaler 42 is zero and a pulse is received via gate 40, it is transmitted via gate 45 and increments counter 25 by one, irrespective of the condition of scaler 42, each pulse arriving via gate 41 (representing a delayed coincidence) increments the scaler 42 by one and is not transmitted to counter 25, when scaler 42 contains a positive binary number and a pulse representing a prompt coincidence arrives via 40, it cannot reach counter 25 (since gate 45 is disabled) but is transmitted via 44 to scaler 42, which counts down by one.

The invention may also be used in a spectrometer having a plurality of channels having different energy discrimination windows, as used for counting mixed or double labelled samples, in which case, there will be a number of separate assemblies A equal to the number of channels.

The operation of the device which has been described can be summarized as follows, with reference to three typical sequences.

First, it will be assumed that circuit 15 detects a coincidence while the device was previously in an initial condition in which:

a. switch 28 is closed for enabling NAND gate 24;
b. the NAND input gates for circuits 30 and 33 are enabled, monostable 31 being at rest;
c. linear gate 17 is disabled;
d. monostable 39 is at rest and therefor does not deliver a signal;
e. ANd gate 34 is disabled;
f. trigger circuit 47 is in the "Q" or "reset" condition;
g. gate 41 is enabled and gate 40 is closed;
h. the content of scaler 42 is zero; and
i. gate 44 is disabled and gate 45 is enabled.

If pulses simultaneously appear on the outputs of the two photomultiplier tubes 11 and 12 and correspond to multiple photons from a same event, they give rise to:

pulses at a given logic level appearing at the outputs of circuits 13 and 14, and a pulse having a height representative of the energy of the photons at the output of the summing amplifier 16.

The only coincidence circuit energized is the prompt coincidence circuit 15; its output pulse is transmitted to flip-flop 47 and puts it in state $\bar{Q}$ or "set" while simultaneously inhibiting circuit 30 and 33 for a time which is determined by 31 and is greater than the transfer time through linear gate 17.

Since gate 17 is enabled, the analog pulse delivered by amplifier 16 reaches the PHA circuit. If the amplitude of the pulse is within the energy gate determined by discriminators 18 and 20, the pulse is transmitted by gate 24 to gate 41 (inhibited by flip-flop 47) and to gate 40 (enabled by flip-flop 47). The pulse is transmitted to counter 25 via gates 40, 43 and 45 and increases the content thereof by one, scaler 47 remaining at zero.

Assuming now that the monostables have reverted to rest condition, that starting conditions (a) and (e) and (h) – (i) remain true, that conditions (f) and (g) are reversed and that a delayed coincidence occurs, operation is as follows:

The pulse arriving via shaper 13 and the pulse arriving via shaper 14 and which occured in advance by a time interval equal to the delay $dt$ introduced by circuit 27 are applied in time coincidence on the inputs of circuit 26 and trigger it, but do not trigger circuit 15. As before, the prompt and delayed logic channels are inhibited by monostable or single shot circuit 31 after gate 17 has been enabled by monostable 39. Circuit 39 changes to the Q or set state.

If the delays provided by 27 and the opening time for 39 have been adequately selected, there is a pseudo-summation of the analog pulses one of which received a time delay $dt$ before the resulting pulse enters the PHA. Statistically, therefore, the PHA transmits an equal number of signals due to prompt and delayed random coincidences. Any pulse due to a delayed coincidence transmitted by AND gate 24 is blocked by gate 40. It is transmitted by NAND gate 41 to the up-count input of scaler 42, whose content becomes 1.

It can be seen that this delayed, i.e. random, coincidence not only fails to increment counter 25 but is also stored by scaler 42, which will prevent counter 45 from counting until it has been returned to zero by prompt coincidences. In this respect, it is to be remembered that a number of prompt coincidences equal to the number of delayed coincidences represents random or illegitimate coincidences corresponding to the background noise, inter alia chemi-luminescence.

Finally, if up-down scaler 42 displays a positive number (for instance 2) and successive prompt coincidences between signals within the PHA range are detected, the starting situation is as follows:

Conditions (a) to (g) of the first case above are again fulfilled;

Gate 44 is enabled and gate 45 is disabled. In this case, the first coincidence pulse travels through AND gate 24 and is applied to the down-counting input of scaler 42 by gate 40, inverter 43 and the enabled NAND gate 44. The contents of the scaler changes from +2 to +1, but no pulse reaches counter 25. Responsive to the next prompt coincidence, the condition of scaler 42 changes from +1 to 0, but the output pulse from AND gate 24 again fails to reach counter 25.

Then, upon occurence of another prompt coincidence, the situation is the same as in the first case hereinbefore described and the output pulse is recorded by counter 25 without modifying the condition of scaler 42.

The device can be modified in numerous ways, more particularly with regard to the construction of assembly A. In addition, the summing circuit 16 can have an additional input which receives the output signal from the second photomultiplier tube 12 via an analog delay line (as indicated by a dashed line on the drawing) providing a delay $dt$ equal to that of circuit 27. Then, prompt and delayed coincidences will be summed in the same manner, thus increasing the accuracy with which random coincidences are subtracted.

In another modified embodiment, the system may include an optionally energized input for permanent blocking of gate 24 and/or for rendering circuit 15 inoperative, the output signals from gate 24 travelling directly to counter 25 (by reversing the condition of flip-flop 47). In this manner, the rate of random coincidences can be measured and the error in the rate of true coincidences may be computed.

Irrespective of the embodiment adopted, it can be seen that the invention provides a real-time count of the events corrected from the background noise due to random coincidences (irrespective of their origin), including an automatic compensation for any decrease or increase in the rate of random coincidences during the measurement period (provided that the rate variation is slow compared with $dt$); the correction is made without any requirement for a manual display or prior evaluation of the expected background noise; the method can be used for measurements even in the presence of willfully-produced emissions of single photons (e.g. in a sample containing bioluminescent material).

We claim:

1. A device for counting specific events of a predetermined nature occuring in a sample in the presence of background noise due to events of another nature in said sample, comprising:

a first detector and a second detector operatively associated with a sample receiving location for the first detector and the second detector to deliver respective signal pulses in time coincidence responsive to each said specific event, while one of said detectors at most delivers a signal pulse responsive to each said event of another nature, first circuit means connected to receive said signal pulses from said first and second detectors and to deliver a first output signal responsive to each prompt coincidence between the signals received from the first and second detectors, time delay circuit means connected to receive the signal pulses delivered by the first detector and in response thereto deliver a signal pulse delayed by a predetermined time duration $dt$, second circuit means connected to receive the signal pulses delivered by the second detector and by the time delay circuit and to deliver a second output signal responsive to each time coincidence, and counting means controlled by said first and second circuit means for counting in real time the excess of the coincidences detected by the first circuit means over the coincidences detected by the second circuit means.

2. A device according to claim 1, for counting radioactive disintegration events occuring in the sample and having an energy within a predetermined energy range, further comprising pulse height analysis means inhibiting the transmission to said counting means of the signal pulses whose height falls outside of a pulse height analysis window corresponding to said energy range.

3. A device for counting scintillations due to radioactive events in a liquid sample and correcting random coincidences between events each delivering a single photon, comprising:

a first photomultiplier tube and a second photomultiplier tube each operatively associated with a sample receiving location for delivering signal pulses in time coincidence responsive to each said radioactive event, one only of said photomultiplier tubes at most delivering a signal pulse responsive to each event resulting in the emission of a single photon, delay circuit means connected to said first photomultiplier to receive the signal pulses delivered therefrom and to provide a signal delayed by a time interval $dt$ responsive thereto, first circuit means connected to said first and second photomultiplier tubes to detect prompt coincidences between the output signals of said first and second photomultiplier tubes and to deliver a logic signal in response to each said prompt coincidence, second circuit means connected to said second photomultiplier tube and to said delaying circuit for detecting delayed coincidences and for delivering a logic signal upon occurence of each said delayed coincidence, summation circuit means connected to receive the signal pulses delivered by the first and second photomultiplier tubes and to deliver an analog signal representing the sum of the amplitudes of the signals, gate means having an input connected to receive said sum signal and an enabling input connected to the outputs of the first and second circuit means for being enabled by either of them, and means connected to receive the signals from said first and second circuit means for counting in real time the excess of signals delivered by the analog gate and corresponding to prompt coincidences over the signals delivered by the analog gate and corresponding to delayed coincidences.

4. A counting device according to claim 3, wherein the summing amplifier has an additional input connected to receive the output signals from said second photomultiplier tube, after they have been delayed by a time interval $dt$.

5. A counting device according to claim 3, wherein the time interval $dt$ is greater than the resolving time of the first and second circuit means.

6. A device according to claim 5, wherein the time interval $dt$ is between 100 ns and 1 $\mu$s.

7. A device according to claim 5, wherein $dt$ is approximately 0.4 $\mu$s.

8. A device according to claim 3, having a pulse height analysing circuit which receives the output signals from the analog gate and transmits only those signals which have an amplitude which falls within a predetermined range.

* * * * *